United States Patent
Stanek (10) Patent No.: US 7,050,652 B2
(45) Date of Patent: May 23, 2006

(54) METHODS AND ARRANGEMENTS TO ENHANCE CORRELATION

(75) Inventor: Clay J. Stanek, Poway, CA (US)

(73) Assignee: Anzus, Inc., Poway, CA (US)

(*) Notice: Subject to any disclaimer, the term of this patent is extended or adjusted under 35 U.S.C. 154(b) by 1027 days.

(21) Appl. No.: 10/093,873

(22) Filed: Mar. 8, 2002

(65) Prior Publication Data

US 2003/0169943 A1 Sep. 11, 2003

(51) Int. Cl.
*G06K 9/64* (2006.01)

(52) U.S. Cl. ............ 382/278; 382/103; 382/209; 382/291; 342/114; 342/115

(58) Field of Classification Search ......... 382/103, 382/107, 209, 278, 291; 342/114, 115
See application file for complete search history.

(56) References Cited

U.S. PATENT DOCUMENTS

| | | | |
|---|---|---|---|
| 4,832,447 A | 5/1989 | Javidi | |
| 5,111,515 A | 5/1992 | Javidi | |
| 5,119,443 A | 6/1992 | Javidi et al. | |
| 5,367,579 A | 11/1994 | Javidi et al. | |
| 5,485,312 A | 1/1996 | Horner et al. | |
| 5,600,373 A | 2/1997 | Chui et al. | |
| 5,699,449 A | 12/1997 | Javidi | |
| 5,794,173 A | 8/1998 | Schutte | |
| 5,841,907 A | 11/1998 | Javidi et al. | |
| 5,903,648 A | 5/1999 | Javidi | |
| 6,002,773 A | 12/1999 | Javidi | |
| 6,021,378 A | 2/2000 | Reiter et al. | |
| 6,104,336 A | 8/2000 | Curran et al. | |
| 6,104,345 A | 8/2000 | Tweg et al. | |
| 6,202,033 B1 | 3/2001 | Lange | |
| 6,225,942 B1 | 5/2001 | Alon | |
| 6,233,357 B1 | 5/2001 | Li et al. | |
| 6,282,496 B1 | 8/2001 | Chowdhary | |
| 6,289,132 B1 | 9/2001 | Goertzen | |
| 6,317,688 B1 | 11/2001 | Bruckner et al. | |
| 6,332,030 B1 | 12/2001 | Manjunath et al. | |
| 6,343,155 B1 | 1/2002 | Chui et al. | |

OTHER PUBLICATIONS

Tien-Hsin Chao & Hua-Kuang Liu, Real-time Optical Holographic Tracking of Multiple Objects, Applied Optics, vol. 28, No. 2, Jan. 15, 1989, pp. 226-231.

(Continued)

*Primary Examiner*—Samir Ahmed
*Assistant Examiner*—Yosef Kassa
(74) *Attorney, Agent, or Firm*—Blakely Sokoloff Taylor & Zafman, LLP (57) ABSTRACT

The present invention is in the area of correlation of tracks from different sensors or sensor systems. Embodiments encompass systems of process and/or equipment to format tracks from more than one sensor to be compared or correlated by statistical and/or optical correlation techniques to determine redundant or duplicate tracks. Embodiments may take into account determinations or calculations to refine coordinate transformations for the sensors and may take into account errors in those determinations by comparing a full or partial history of the data from tracks associated with the same object from the same sensor. Further, many embodiments comprise software that can execute on a laptop, desktop, or similar computer.

31 Claims, 7 Drawing Sheets

OTHER PUBLICATIONS

Eugene Hecht, Adelphi University, Optics, Third Edition, pp. 437-438, 442, 532, 456, 457, 602-604, Addison-Wesley.

Kenneth H. Fielding, Joseph L. Horner, Charles K. Makekau, Optical Fingerprint Identification by Binary Joint Transformation, Optical Engineering, vol. 30, No. 12, Dec. 1991, pp. 1958-1961.

Subhasis Saha, Image Compression—from DCT to Wavelets: A Review, ACM Crossroads Student Magazine, http://www.acm.org/crossroads/xrds6-3/sahaimgcoding.html., pp. 1-14.

H. John Caulfield, Templates for Invention in the Mathematical and Physical Sciences with Applications to Optics, Proceedings of SPIE vol. 4392, 2001, pp. 104-117, SPIE.

Eddy C. Tam, Francis T. S. Yu, Don A. Gregory, Richard D. Juday, Autonomous Real-Time Object Tracking with an Adaptive Joint Transform Correlator, Optical Engineering, vol. 29, No. 4, Apr. 1990, pp. 314-320.

Yu Hen Hu, University of Wisconsin, Madison, Visual Artifact Reduction By Post-Processing, Presented at Carnegie Mellon University, Dept. ECE, Nov. 1, 2001, pp. 69.

Shahriar Mirabbasi, On the Design of Multirate Filter Banks by H—Optimization, Master of Applied Science, 1997, Dept. of Electrical & Computer Engineering, University of Toronto, pp. 37.

C. S. Weaver & J. W. Goodman, A Technique for Optically Convolving Two Functions, Applied Optics, vol. 5, No. 7, Jul. 1966, pp. 1248, 1249.

Ali M. Reza, Wavelet Characteristics, Spire Lab, UWM, Oct. 19, 1999 White Paper, pp. 1-9.

http://www.diffuse.org/compress.html, Diffuse Guide to Image Compression, pp. 1-8.

Edward H. Adelson, Subband Coring for Image Noise Reduction, Internal Report, RCA David Sarnoff Research Center, Nov. 26, 1986, pp. 14.

Julien Reichel, Gloria Menegaz, Marcus J. Nadenau & Murat Kunt, Integer Wavelet Transform for Embedded Lossy to Lossless Image Compression, Signal Processing Laboratory, Swiss Federal Institute of Technology, Lausanne, Switzerland, pp. 1-9.

Shuo-Yen Choo & Gregory Chew, EE362—JPEG 2000 and Wavelet Compression, http://www-ise.stanford.edu/class/psych221/00/shuoyen, pp. 1-23.

Cardinal Warde & Arthur D. Fisher, Spatial Light Modulators: Applications and Functional Capabilities, Optical Signal Processing, Copyright 1987 by Academic Press, Inc., pp. 477-523.

Martin Vetterli & Jelena Kovacevic, "Wavelets and Subband Coding," Wavelets, Filter Banks and Multiresolution Signal Processing, 1995, pp. 1-13, Prentice Hall.

Bahram Javidi & Chung-Jung Kuo, Joint Transform Image Correlation Using a Binary Spatial Light Modulator at the Fourier Plane, Applied Optics, vol. 27, No. 4, Feb. 15, 1988, pp. 663-665.

Henri Rajbenbach, Dynamic Holography in Optical Pattern Recognition, SPIE vol. 2237, Optical Pattern Recognition V (1994), pp. 329-346, SPIE.

Bahram Javidi, Processing for Encryption and Security Systems. Optics & Photonics News, Mar. 1997, pp. 29-33.

Bahram Javidi & Joseph L. Horner, Single Spatial Light Modulator Joint Transform Correlator, Applied Optics, vol. 28, No. 5, Mar. 1, 1989, pp. 1027-1032.

Bahram Javidi, Nonlinear Joint Power Spectrum Based Optical Correlation, Applied Optics, vol. 28, No. 12, Jun. 15, 1989, pp. 2358-2367.

Bahram Javidi, Jun Wang & Qing Tang, Nonlinear Joint Transform Correlators, Pattern Recognition, vol. 27, No. 4, Copyright 1994 Pattern Recognition Society, Printed in Great Britian, pp. 523-542.

METHODS AND ARRANGEMENTS TO ENHANCE CORRELATION

FIELD OF INVENTION

The present invention is in the field of processing data from sensors. More particularly, the present invention provides a method, apparatus, system, and machine-readable medium to format tracks from sensors such as radars, global positioning systems, laser target designators, seismic sensors, and the like, to enhance correlation.

BACKGROUND

Correlating objects, or correlation, is a process of comparing tracks from different radars to determine which tracks are duplicate tracks. Tracks can include data sensed about an object or target by a sensor such as radars, global positioning systems, laser target designators, seismic sensors, and the like, and the data can include the positions and velocities of planes, ships, troops, or other targets. The goal of correlation is to reduce the number of redundant or duplicate tracks so that a theater accurately depicts the unique objects present within the area of interest. Correlation requires substantial statistical analysis in many applications since each radar tracks the position of the object with respect to an unknown or imprecisely known location and orientation, especially in applications wherein one or more radars may change positions over a period of time. A global positioning system and compass system at each radar estimates the location and orientation within a margin of error, however, it is a relatively rough estimate, too rough for many applications.

The output of a correlation system provides tracks to a system to model the theater, which typically encompasses a greater geographical area than the range of an individual radar. The size and accuracy of the theater, however, is limited by the amount of data that can be processed. For example, a radar can drop a target or object on occasion. The problem of dropped targets is likely resolved by overlapping the sensor range with more than one radar. However, overlapping the sensor range with two radars produces twice the data to process for the overlap and can lead to association ambiguities that must be resolved.

Computers, such as Cray computers, reduce the number of duplicate tracks of objects within the theater by cross-correlating the positions and velocities of each track of a first radar against the positions and velocities of each track of a second radar, wherein the range of the second radar overlaps part of the range of the first radar. After cross-correlating positions and velocities of the tracks, the correlation ratings or costs are compared to determine which tracks from the first radar match tracks from the second radar. Finally, the costs to pair or match each track of the first radar with a track from the second radar are compared with a reference cost to determine whether the probability that the tracks correspond to the same object is high enough to exclude one of the tracks from the theater. Even at this point, ambiguities can exist; there might be more than one possible association for one or more targets. In this case, we are left with what is known as the sparse matrix assignment problem. For example, the Cray computer receives the position and velocity of a plane from the first radar transformed to absolute coordinates. The global coordinates are determined based on a position and azimuth from a global positioning system and compass system for the first radar. The Cray computer also receives a position and velocity for the same plane from a second radar in absolute coordinates. Error involved in the transformation cause the tracks to indicate different positions for the same target. Using statistical techniques founded in maximum likelihood theory, the Cray computer compares the position and velocity of each track from the first radar to each track of the second radar to determine which tracks are close enough to label as duplicates. However, by comparing tracks of objects at one moment in time and individually, error sources such as noisy data or temporal sampling mismatches cause current systems to incorrectly match tracks. Further, the computational demands to associate each track individually is significant and increases significantly with the number of tracks to compare and the number of radars that overlap.

BRIEF FIGURE DESCRIPTIONS

In the accompanying drawings, like references may indicate similar elements.

Skilled artisans appreciate that elements in the figures are illustrated for simplicity and clarity and have not necessarily been drawn to scale. For example, the dimensions of some of the elements in the figures are exaggerated relative to other elements to help to improve understanding of embodiment(s) of the present invention

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Embodiments encompass systems of process and/or equipment to format tracks from more than one sensor to be compared or correlated by statistical and/or optical correlation techniques to determine redundant or duplicate tracks. In many of the embodiments the sensors may comprise radars, global positioning systems, laser target designators, seismic sensors or systems of seismic sensors comprising hydrophones and geophones, and other similar systems. Low latencies involved with correlating and gridlocking data, through the use of correlation images, may facilitate the use of this wider variety of sensors. A statistical technique may include hypothesis testing, least-squares estimation or Kalman filtering, Munkres assignment, or the like.

Optical techniques may comprise frequency plane correlation, joint transform correlation, or a hybrid correlation, achieved with a combination of one or any of electrically addressed spatial light modulation and optically addressed spatial light modulation devices. One such technique, incorporated herein by the following reference, is described in a co-pending patent application entitled "Gridlocking and Correlation Methods and Arrangements", Ser. No. 10/093,535, filed on the same day, and assigned to Anzus, Inc. Embodiments may take into account determinations or calculations to refine coordinate transformations for the sensors and may take into account errors in those determinations by comparing a full or partial history of the data from tracks associated with the same object from the same sensor. Further, many embodiments comprise software that can execute on a laptop, desktop, or similar computer.

Figure 1:
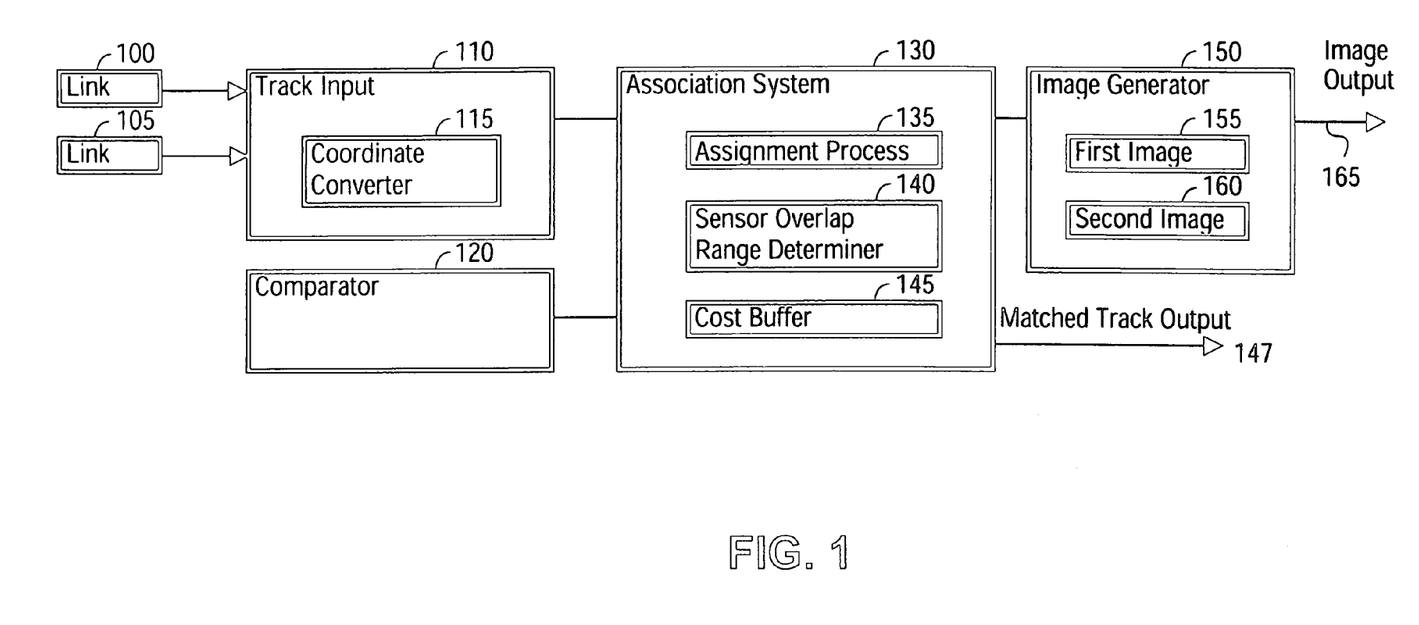
FIG. 1 depicts an embodiment of a system to format tracks from sensors to enhance correlation.

Referring now to FIG. 1, there is shown an embodiment of a system to format tracks from sensors to enhance correlation. The system may comprise a track input 110; a comparator 120; an association system 130; an image generator 150; and an image output 165. Track input 110 may receive a first track to describe a first object and a second track to describe a second object from link 100 and/or link 105. Links 100 and 105 may comprise a network to transmit tracks, or data from sensors to describe objects within the range of the sensors. In some situations, the first track and the second track may comprise data about the same object from two different sensors as a result of an overlap in the coverage or range of the sensors. The tracks may comprise data about the position of the object and data about the speed and/or direction of the object, such as a vector quantity describing the velocity of the object.

In several embodiments, the tracks may comprise track identifications (I.D.). In many of these embodiments, the track identifications may comprise data associating the track with a sensor and data associating the track with prior and/or subsequent tracks for the same object from that sensor. For example, the first track may comprise a number identifying the originating sensor as the first sensor and a number identifying the object as the first object. A subsequent track by the first sensor for the first object may comprise a track (I.D.) with a number to identify the first sensor and a number to identify the first object. The subsequent track, however, may describe the position of the first object at a later point in time.

In some embodiments, track input 110 may comprise a coordinate converter 115 to convert coordinates of the first track and the second track to a type of coordinate system. Coordinate converter 115 may convert data, such as a position or velocity, from coordinates such as ellipsoidal or spherical to, for example, Cartesian coordinates. Converting the data of the first track and the second track to consistent or uniform coordinate systems may facilitate the generation of the first image and the second image.

In many embodiments, comparator 120 may determine a coordinate transformation for a first sensor based upon an output of a gridlocking system. Comparator 120 may receive an output of a gridlocking system, such as a gridlocking system to compare images of tracks coupled with an optical correlation system. One such technique uses an image format, incorporated herein by the following reference, described in a co-pending patent application entitled "Methods and Arrangements to Enhance Gridlocking", Ser. No. 10/094,037, filed on the same day, and assigned to Anzus, Inc. In some of these embodiments, the output of the gridlocking system may comprise data such as the pair of images with the highest correlation, the correlation value, and an offset adjustment for the images to obtain the highest correlation value. In such embodiments, comparator 120 may have or receive data to determine the sensor(s) associated with the offset and the orientation adjustment associated with the images. Comparator 120 may output the offset and orientation adjustment to association system 130 to transform the data of tracks for the sensor(s).

In further embodiments, comparator 120 may output correlation values or costs to associate tracks, such as the first track and the second track, with the same object. For example, comparator 120 may receive the output of an optical correlator resulting from a comparison of images from a first object of first sensor and a second object of a second sensor. The optical correlator may output light having an intensity proportional to or substantially proportional to a cross-correlation between the images. That intensity may be converted into an electrical and/or digital signal and transmitted to comparator 120. Comparator 120 may transmit a cost based upon the correlation value or equivalent to the correlation value to association system 130. In many of these embodiments, association system 130 may comprise a cost buffer 145 to store the cost.

Association system 130 may couple with comparator 120 to associate the first track with the first sensor and to adjust data associated with the first sensor in accordance with the coordinate transformation. Association system 130 may comprise an assignment process 135; sensor overlap range determiner 140; and cost buffer 145. Assignment process 135 may associate the first track with the second track, wherein the first object is determined to be the second object to a degree of probability. For example, association system 130 may receive a cost to associate tracks from the first sensor with tracks from the second sensor and store the costs in cost buffer 145. Assignment process 135 may compare the costs, such as with a Munkres assignment algorithm, to determine the tracks that likely describe the same objects and output matched pairs of tracks via matched track output 147. In further embodiments, the cost of associating tracks of each pair may be compared against a reference cost or a reference cost curve to determine when the likelihood that the tracks describe the same object is sufficiently high to exclude describing an object for one of the tracks in the theater.

Some embodiments may comprise sensor overlap range determiner 140. In these embodiments, sensor overlap range determiner 140 may select data associated with the first track and data associated with the second track to generate the first image and the second image. Sensor overlap range determiner 140 may have or receive data regarding overlapping ranges of the first sensor and the second sensor, and may select track data to generate an image based upon the overlap. For instance, sensor overlap range determiner 140 may receive data indicating that the range of the first sensor overlaps the range of the second sensor and/or data describing coordinates of the overlap. Sensor overlap range determiner 140 may, based upon the overlap data, select tracks for a first object, including tracks previously received, from the first sensor and, in some embodiments, a subset of those tracks based upon the overlap. The track data associated with the selected tracks may be forwarded to image generator 150 to generate the first image. Similarly, sensor overlap range determiner 140 may select tracks for the second object from the second sensor to generate the second image.

In still further embodiments, association system 130 may comprise a track selector to select tracks to forward to image generator 150 for a comparison. In many of these embodiments, the track selector may comprise a round-robin algorithm or selection logic to facilitate a comparison between the tracks of the first sensor and the tracks of the second sensor. The number of different comparisons may depend upon the number of sensors, the number of sensors having overlapping ranges, and/or the number of objects within the overlap(s).

Image generator 150 may couple with association system 130 to generate a first image based upon data associated with the first sensor and to generate a second image based upon data associated with a second sensor, wherein the second sensor is associated with the second track. Image generator 150 may receive tracks or data associated with tracks for the first object from the first sensor and tracks or data associated with tracks for the second object from the second sensor. The tracks or data may comprise the current data received for the first object and, in some situations, data previously received for the first object from the first sensor. For example, association system 130 may store data about the first object from the first sensor and forward the data, or a subset thereof, to image generator 150.

In some embodiments, image generator 150 may store previously received data for the first object from the first sensor. In several of these embodiments, image generator 150 may store data of the first object in the form of an image and build upon that image after a subsequent track is received for the first object from the first sensor. Similarly, association system 130 or image generator 150 may store the data or tracks for the second object from the second sensor, or other objects from the second sensor or other sensors. In embodiments wherein track data may be stored by image generator 150, association system 130 may forward current tracks or track data to image generator and/or instruct image generator 150 to draw the first image and the second image based upon the first track, second track, and/or previously received tracks or data associated with the first track and/or second track.

Figure 3A:
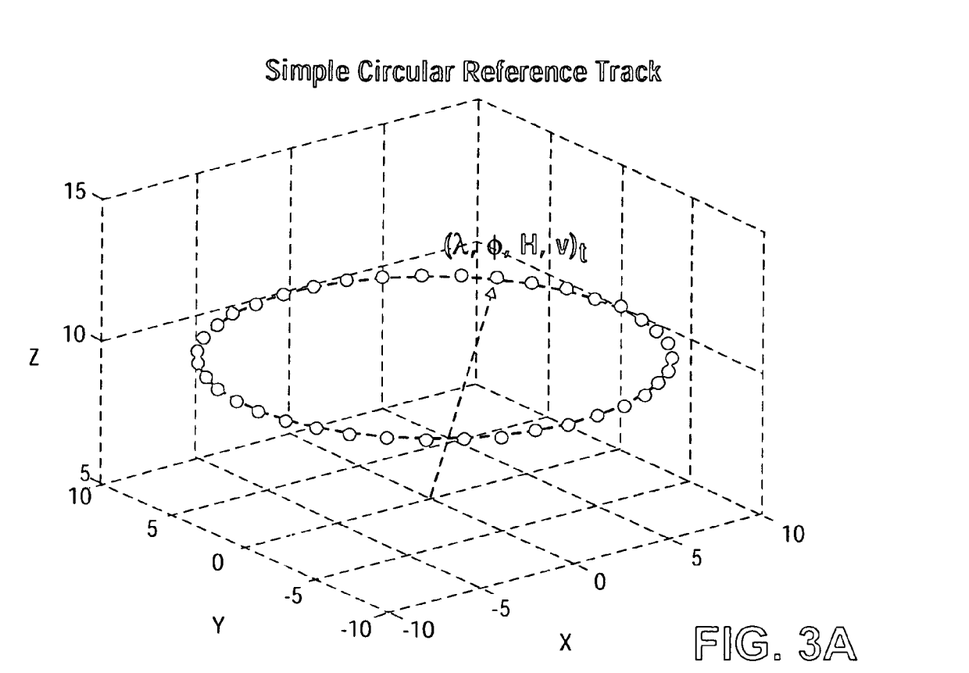
FIGS. 3A–B depict a path of an object as sensed by a sensor and an embodiments of an image as a format for the tracks for the object from the sensor to enhance correlation.

Image generator 150 may generate the first image based upon current and/or prior data or tracks for the first object from the first sensor. The tracks or data for the first object may comprise a position or coordinates of the first object with respect to the first sensor at different and/or successive moments in time. In many embodiments, the sensors may comprise locating equipment such as a global positioning system and/or a compass system to estimate the absolute position of the sensors and the positions may be transformed to an absolute coordinate system or other coordinate system based upon the estimated absolute positions. For instance, tracks may be transformed to a coordinate system local to the theater to facilitate comparison of the data associated with the tracks and/or generating images for objects. FIG. 3A, for example, illustrates tracks received for a first object from the first sensor in ellipsoidal coordinates. The track as described also comprises a vector to indicate the speed and direction of the first object at each position. The data of the track may be transformed to Cartesian coordinates and the first image, shown in FIG. 3B may be generated to describe the data of the tracks.

Figure 3B:
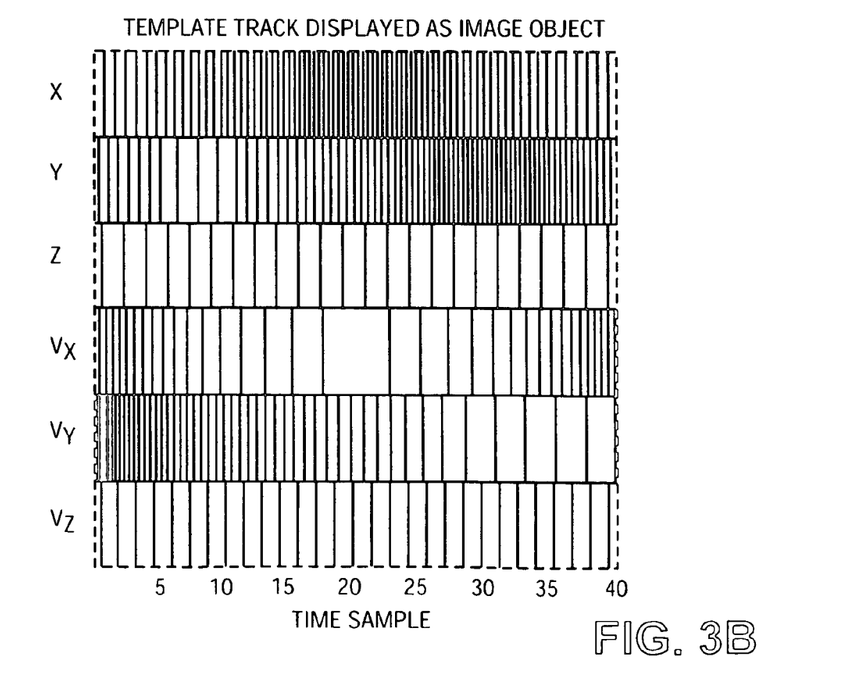

In FIG. 3B, the position of the first object is described with respect to a reference with a color generated in accordance with the distance of the first object from the origin of the coordinate system. Embodiments comprising sensor range overlap determiner 140 may select an origin in accordance with the overlap or based upon the size of the overlap. At each moment in time described by a track, a color, such as colors of a gray scale, may be generated to describe the distance with an x-coordinate, a y-coordinate, and/or a z-coordinate, demarked X, Y, and Z. Further, as shown in FIG. 3B, the speed and direction of the first object may be described in vector components $V_x$, $V_y$ and $V_z$. The time axis is shown as a horizontal axis, in the present embodiment, and is marked with steps of time or numbers of tracks. The markings along the vertical and horizontal axes are for illustration. The time axis indicates that the present embodiment includes 40 units of time or 40 track reports. Other embodiments may include more or less tracks, depending upon the amount of data collected and the amount of image space that may be dedicated to an object from one sensor. In several of these embodiments, a track interpolator system may fill in gaps where data may be missing, such as a dropped track, by interpolating between the data at time one, for example, and the data at time three to determine the data at time two. The second image may be generated in a similar manner with data or tracks associated with the second object, to generate a similar pattern and/or image.

In the present embodiment, image generator 150 may comprise a generator for the first image 155 and the second image 160 to facilitate preparation of the images in parallel or substantially in parallel. In other embodiments, the images may be generated serially or more than two images may be generated in parallel or substantially in parallel.

Image output 165 may couple with image generator 150 to output the first image and the second image for comparison to determine whether the first object is the second object. Generating images, such as the image depicted in FIG. 3B, based upon data associated with the tracks about a position and/or the speed and direction of the first object may facilitate a comparison or correlation between the data about a first object and data about a second object by an optical correlator or a joint transform correlator. In other embodiments, the images may be correlated with other pattern recognition techniques such as Fourier transformation and inverse transformation and/or statistical correlation techniques, such as hypothesis testing or other Bayesian inference techniques.

Figure 2:
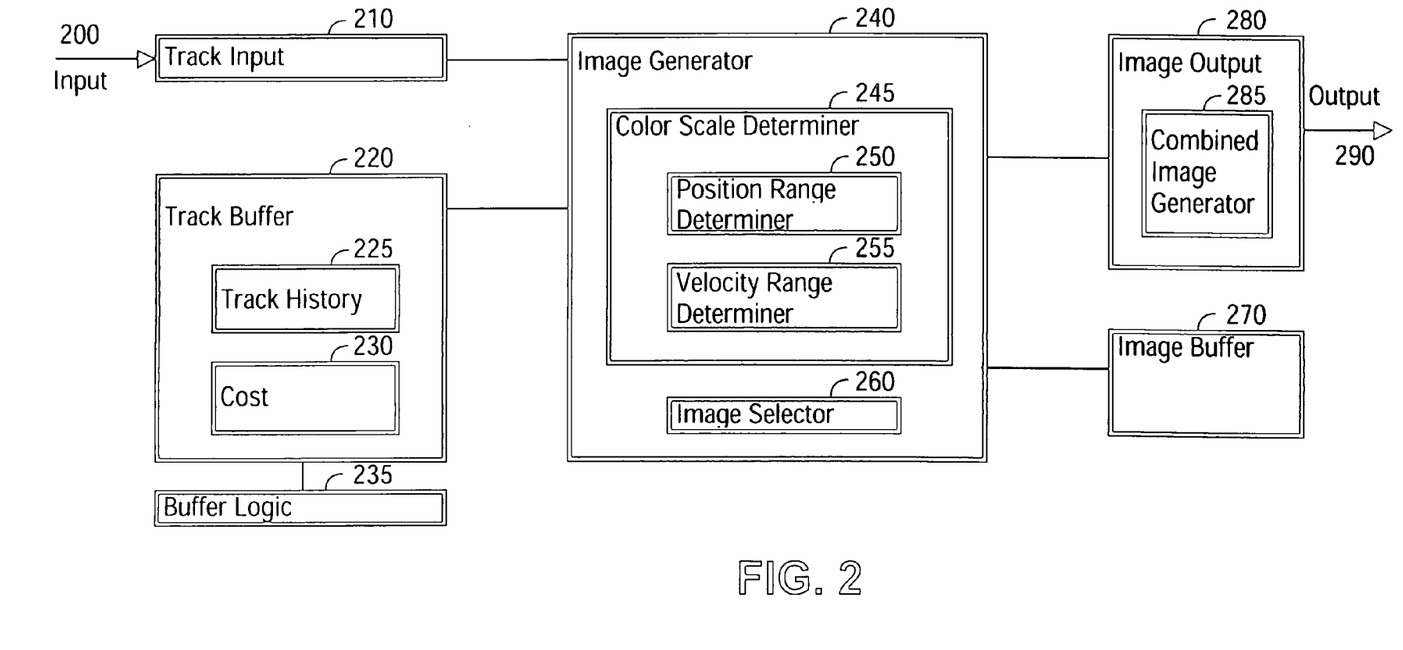
FIG. 2 depicts an embodiment of an apparatus to format tracks from sensors to enhance correlation.

Referring now to FIG. 2, there is shown an embodiment to format tracks from sensors to enhance correlation. The embodiment may comprise a track input 210, an image generator 240, and an image output 280. Track input 210 may receive a first track to describe a first object and a second track to describe a second object via input 200. The tracks may comprise data indicating position, speed, and/or direction of one or more objects from one or more sensors at the same and/or different moments in time. The tracks may also comprise data to associate data to a sensor and an object such as the first sensor and the first object. The data associated with the tracks may be transmitted to image generator 240. In some embodiments, part of the track data may be used to generate an image and may be transmitted to image generator 240.

Image generator 240 may couple with track input 210 to generate a first image based upon data associated with the first track and to generate a second image based upon data associated with the second track. Image generator 240 may comprise a color scale determiner 245 and an image selector 260. Color scale determiner 245 may couple with image generator to determine a color scale based upon a range of positions associated with the first image and the second image. For example, position range determiner 250 may determine that the first track and/or prior tracks associated with the first object may indicate positions that fall within one mile and the second track and/or prior tracks associated with the second object indicate positions that fall within one mile. As a result, color scale determiner 245 may determine that image generator 240 may generate color for a position based upon a color scale with a range from zero feet to one mile. In other situations, the area of movement for the first and second objects, as indicated by tracks, may span a distance longer than or shorter than a mile so position range determiner 250 may determine that the color scale may span more than one mile or less than one mile, respectively.

Similarly, color scale determiner 245 may comprise velocity range determiner 255 coupled with said image generator to determine a color scale based upon a range of velocities associated with the first image and the second image. In other embodiments, the color scale may be fixed or graded to reduce the number of times track data is used to generate an image. For instance, in embodiments that determine a color scale based upon two or more images to output for comparison, the color scale for the first image may comprise a first scale for a period of time while the first object is moving at a slow rate and a larger scale after the first object accelerates. As a result, the image generated from data prior to the acceleration may be generated with one color scale and the image generated subsequent to the acceleration may be generated a new color scale. However, when the color scale(s) may be consistently or substantially consistently applied to the generation of images for objects, the images may be stored and images for subsequent track data may be appended to the image.

In some embodiments, image generator 240 may comprise image selector 260 to select images to compare. Image generator 240 may continuously or substantially continuously generate images and/or append to images based upon incoming tracks. Many embodiments, for example, may comprise image buffer 270 to store images as the images are generated. Image selector 260 may select images from image buffer 270 to forward to image output 280 for comparison. Image selector 260 may comprise selection circuitry or logic to select images for comparison in a round-robin or priority-based manner. The priority-based selection, for instance, may select images based upon a priority for an area in the theater or based upon a priority of a request for a display of an area of the theater. In some embodiments, image selector 260 may select more than one track image to compare against a reference track image simultaneously or substantially simultaneously, such as may be illustrated by FIG. 4.

In other embodiments, image buffer 270 may act as a queue and image selector 260 may select tracks from an incoming set of tracks to generate images for placement in the image buffer 270. The selection of images to generate may be based upon a cost-based priority. The cost-based priority may base the selection of images for comparison on the cost associated with a pair of tracks. For instance, a pair of tracks may be matched but the likelihood that the tracks are incorrectly paired may cause the pair of tracks to have a high priority for comparison upon receipt of subsequent tracks for the pair of tracks.

Further embodiments may comprise track buffer 220 and buffer logic 235. Track buffer 220 may couple with image generator 240 to store the first track and the second track. In many of these embodiments, the images generated from the tracks may be generated based upon a track history 225 and/or a cost 230. Track history 220 may comprise memory to store tracks or track data to generate subsequent images for the corresponding object. For example, track input 210 may receive a first track associated with a first object and a second track associated with a second object. The positions and velocities indicated by the first track and the second track may be stored in track history and used to generate a first image and a second image for comparison. After the first image and the second image are compared, track buffer 220 may receive a cost 230 to associate the first object and the second object based upon the track data associated with the first track and the second track. Subsequently, track input 210 may receive a third track associated with the first object and/or a fourth track associated with the second object. Track buffer 220 may forward track data related to the first object from the first track to image generator 240 to generate a new first image. In addition, track buffer 220 may forward data related to the second object from the fourth track to image generator 240 to generate an updated second image. After the updated images are compared, track buffer 220 may receive a new cost 230 to associate the first object with the second object.

Buffer logic 235 may couple with track buffer 220 to remove contents of track buffer 220 such as track history 225 and cost 230 after an object moves beyond the range of a sensor. For example, a first object may comprise an aircraft and the aircraft may fly through the range of a first sensor, such as a radar. The radar may report the position and velocity of the aircraft while the aircraft remains within the range of the radar but once the aircraft leaves the range of the radar, the radar may not report data about the first object again. Even when the object re-enters the range of the radar the radar may not recognize the aircraft as the first object. Thus, buffer logic 235 may remove the content of track buffer 220 that is related to the first object. In some of these embodiments, the contents of track buffer 220 may be cleared of data about the first object after two or more sets of tracks are received from the radar without a track associated with the first object. The number of the sets of tracks may depend upon the likelihood that a sensor may drop a target. In other embodiments, the track input 210 may receive data from a sensor to indicate that the target went outside the range of the sensor. In many of these embodiments, buffer logic 235 may mark the memory used for historical track data associated with the object as available or free space.

Figure 4:
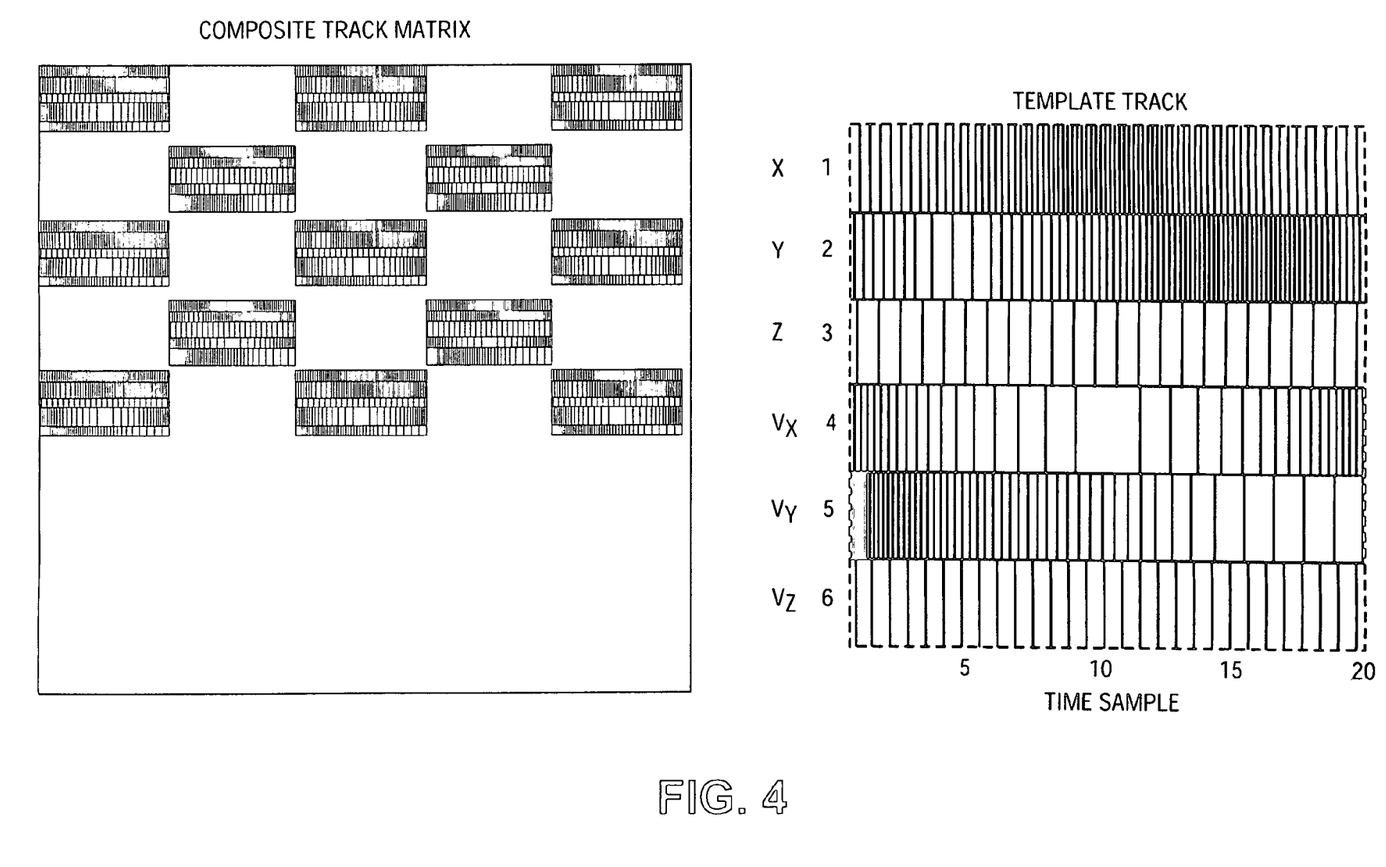
FIG. 4 depicts embodiments of a first or reference image and thirteen comparison images combined in a single image to enhance correlation.

Image output 280 may couple with image generator 240 to output the first image and the second image for comparison via output 290. Image output 280 may output the images to determine whether the first object is the second object. In some embodiments, image output 280 may comprise a combined image generator 285. Combined image generator 285 may generate an image comprising the first image and the second image. The first image and the second image may comprise a reference image and one or more images to compare to the reference image, or more than one reference image with images to compare against the reference images. For example, FIG. 4 depicts images of the left to compare against a reference image on the right. In several embodiments, the reference image may be the same size as the images to compare against the reference image. The layout of the combined image depicted in FIG. 4 may facilitate a comparison of the reference image on the right with thirteen images on the left simultaneously or substantially simultaneously. In other embodiments, a larger or smaller number of images may be compared against the reference image(s) with one or more optical or statistical correlators.

In still further embodiments, one of the comparison images may comprise a copy of the reference image. The copy of the reference image, when compared with the reference image on an optical correlator, for instance, may produce an interference intensity for an autocorrelation of the reference image that is equivalent to or substantially proportional to a maximum cross-correlation value for the reference image with a comparison image. The results may then be normalized with the results of other comparisons based upon the interference intensities of each autocorrelation.

Figure 5:
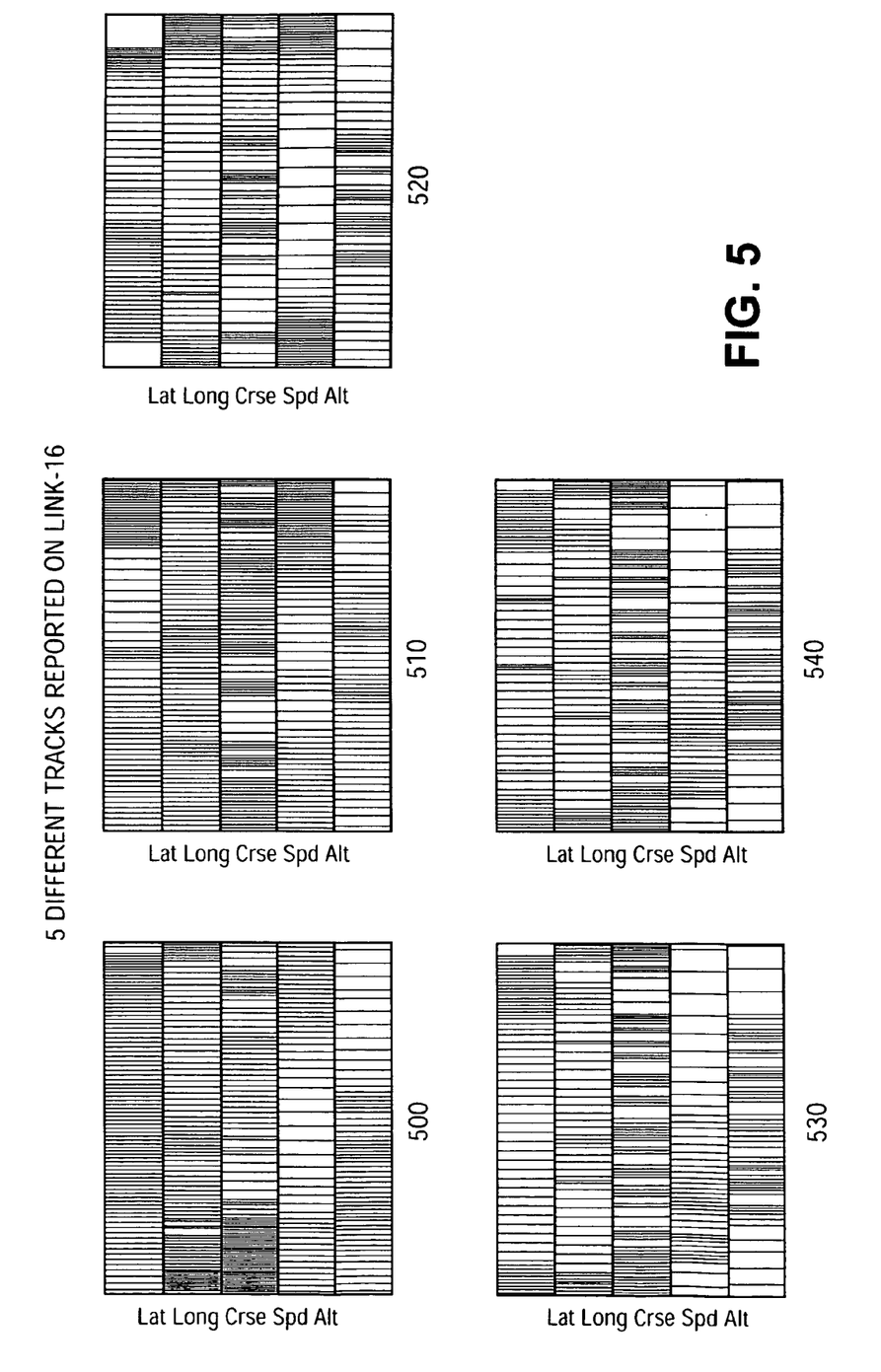
FIG. 5 depicts an embodiment of five images generated to enhance correlation

Referring now to FIG. 5, there is shown five example images for tracks formatted to enhance correlation from real data. The tracks provide data over a period of time including latitude, longitude, course, speed, and altitude. Each image may comprise rows comprising types of data and columns comprising data at different times or time references. The result of such image generation is that images comprising data about the same object present substantially equivalent or similar patterns. For instance, images 530 and 540 represent images generated for tracks of the same object by different sensors.

Figure 6:
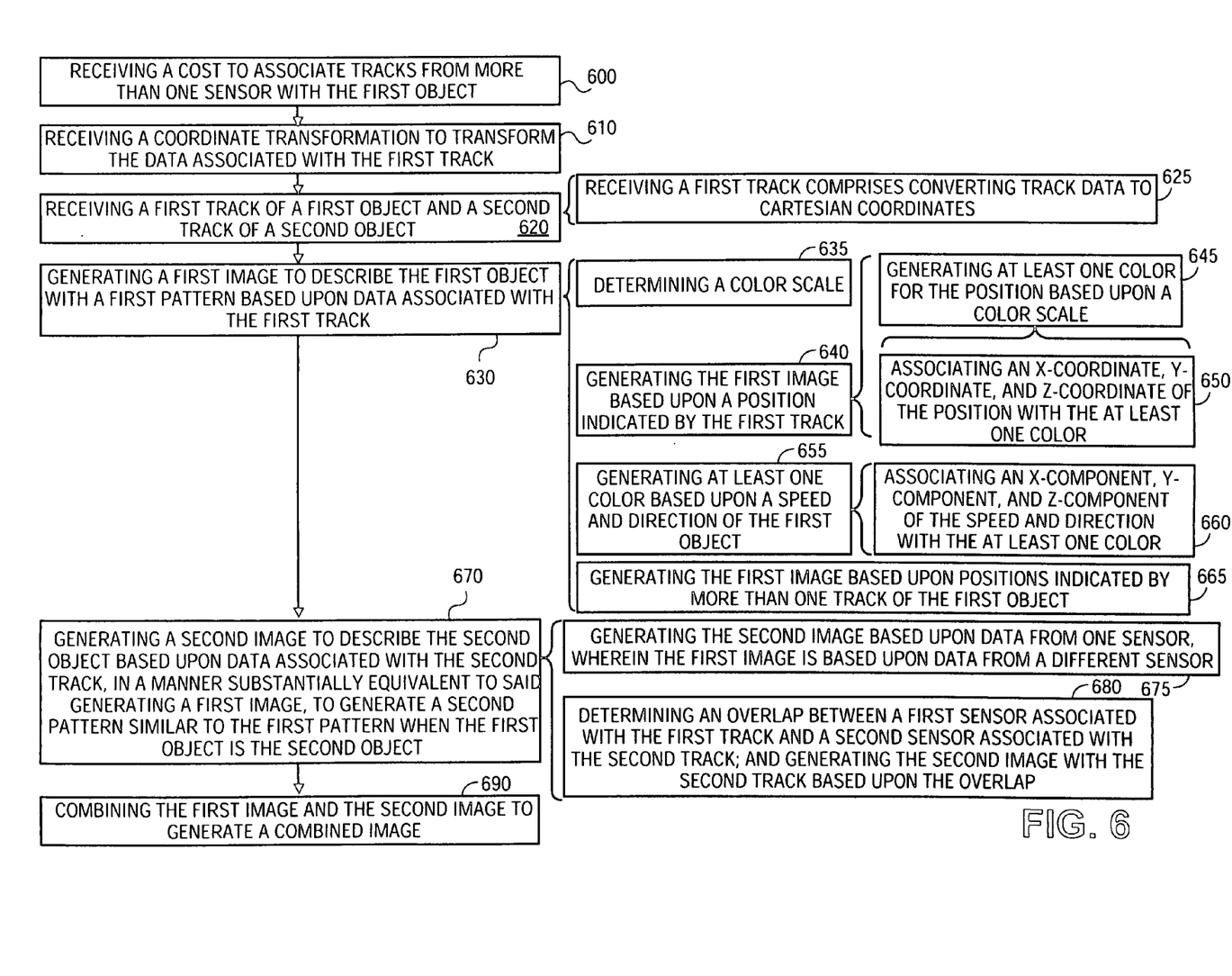
FIG. 6 depicts a flow chart of an embodiment to format tracks from sensors to enhance correlation.

Referring now to FIG. 6, there is shown a flow chart of an embodiment to format tracks from sensors to enhance correlation. The flow chart may comprise receiving a cost to associate tracks from more than one sensor with the first object 600; receiving a coordinate transformation to transform the data associated with the first track 610; receiving a first track of a first object and a second track of a second object 620; generating a first image to describe the first object with a first pattern based upon data associated with the first track 630; and generating a second image to describe the second object based upon data associated with the second track, in a manner substantially equivalent to said generating a first image, to generate a second pattern similar to the first pattern when the first object is the second object 670.

Receiving a cost to associate tracks from more than one sensor with the first object 600 may comprise receiving an estimated correlation between the second track and the first track. In many embodiments, receiving a cost 600 may comprise receiving a cost(s) for associating with more than one track. The cost may comprise a cross-correlation value, or a value substantially equivalent or proportional thereto, for associating the first track or a history of tracks for the first object with a second track or a history of tracks for the second object. For example, the second sensor may output five tracks from time one to time five for an object. The times may represent sweeps of a radar. The first sensor may overlap the range of the second sensor such that the first sensor tracks the object at time four and time five. Receiving a cost 600 may, in this situation, comprise receiving a correlation or probability that the track data from the second sensor, for times one through four, describes the same object as the track from the first sensor at time four. Subsequently, receiving a cost 600 may comprise receiving a cost to associate tracks one through five of the second sensor with tracks four and five of the first sensor.

In further embodiments, receiving a cost to associate tracks from more than one sensor with the first object 600 may comprise receiving a number or correlation score that may be compared to a threshold or reference cost. For example, a track-to-track correlation process may produce a number or a correlation score that may be compared to a threshold or reference cost to determine a matching track. The comparison may result in several tracks from one sensor being associated with a cost above the threshold cost for a single track on another sensor. The optical correlator may not be a perfect discriminator. Assuming this occurs multiple times, an embodiment may incorporate a system to solve ambiguities such as a Munkres assignment and JVC assignment, or a sparse assignment algorithm.

In several embodiments, receiving a coordinate transformation to transform the data associated with the first track 610 may comprise receiving a data describing the offset and/or rotational difference between the location and orientation of the first sensor with respect to the second sensor. In other embodiments, the offset and/or rotational difference may describe the difference between the location and orientation of a track from the first sensor and a track from the second sensor, a global or absolute reference, or a reference local to the theater of interest. The coordinate transformation may be applied to an incoming or subsequent track from the first sensor. Further, a coordinate transformation received for the second sensor and/or other sensors may be applied to tracks from those sensors to adjust or refine the origin of the coordinate systems of incoming tracks.

Receiving a first track of a first object and a second track of a second object 620 may receive data about the first object as sensed by a first sensor and data about the second object as sensed by a second sensor. After sensing the data, a sensor may form the data into a packet to indicate an origin, object or target number, and/or track number for the data. In some embodiments, the data may comprise a tag to indicate a time frame the data represents. In other embodiments, receiving a first track of a first object and a second track of a second object 620 may receive tracks real-time with little or no latency.

In several embodiments, receiving a first track of a first object and a second track of a second object 620 may comprise converting track data to Cartesian coordinates 625. Converting track data to Cartesian coordinates 625 may comprise converting the data of one or more tracks from ellipsoidal or spherical coordinates. In other embodiments, receiving a first track of a first object and a second track of a second object 620 may comprise converting track data to spherical, ellipsoidal, or other coordinates.

Generating a first image to describe the first object with a first pattern based upon data associated with the first track 630 may generate signals to transmit to a display, such as a spatial light modulator or the like, to display the first image. Generating a first image to describe the first object with a first pattern based upon data associated with the first track 630 may comprise determining a color scale 635; generating the first image based upon a position indicated by the first track 640; generating at least one color based upon a speed and direction of the first object 655; and generating the first image based upon positions indicated by more than one track of the first object 665. Determining a color scale 635 may divide a range of colors or a range of opacities by a position, distance, speed, direction, velocity, latitude, longitude, altitude, course, and/or etc., to determine a color or opacity to generate based upon data indicated by the first track. For example, given grays one through 256, a color scale for distance may comprise dividing the 256 colors by a set distance, a distance based upon an area of interest, a distance based upon the theater size, and/or a distance based upon data in the tracks. In other embodiments, the distances represented by each color may be determined based upon an accelerating, decelerating, logarithmic, or exponential scale. In some embodiments, the second image may be generated with the same color scale.

Generating the first image based upon a position indicated by the first track 640 may generate the first image with a pixel or set of pixels set to describe the distance or position the first track may indicate for the first object. Generating the first image based upon a position indicated by the first track 640 may comprise generating at least one color for the position based upon a color scale 645. The color scale may indicate that a position indicated by the first track at time one is represented by a first color at a location in the image designated for position at time one. As a result, the first color is generated in the location by displaying or generating a signal to display a pixel or pixels of the first color at the location.

In many embodiments, generating at least one color for the position based upon a color scale 645 may comprise associating an x-coordinate, y-coordinate, and z-coordinate of the position with the at least one color 650. The x-coordinate, y-coordinate, and z-coordinate may represent the position in Cartesian coordinates. Splitting the position into components may provide more data about an object than other embodiments, such as embodiments that may generate the image based upon the distance and may result in an increased ability to distinguish between objects for the correlation system. However, generating three pixels or sets of pixels for the components rather than one pixel for the distance may increase the image size or use a greater input bandwidth, particularly when the first image may be generated based upon more than one track for the same object such as prior tracks with respect to time or time of receipt.

Further embodiments, may comprise generating at least one color based upon a speed and direction of the first object 655. Generating at least one color based upon a speed and direction of the first object 655 may generate the first image based upon the speed and/or direction of the first object rather than or in addition to the position of the object. Generating at least one color based upon a speed and direction of the first object 655 may comprise associating an x-component, y-component, and z-component of the speed and direction with the at least one color 660. Other embodiments may comprise generating the first image based on position, distance, speed, direction, velocity, latitude, longitude, altitude, course, and/or etc.

Generating the first image based upon positions indicated by more than one track of the first object 665 may comprise storing a history of track data from the first sensor for the first object in memory as data or a generated image and generating the first image based upon the history of track data. In some embodiments, a limit of the size of the first image may limit the amount of track data used to generate the first image. For example, 20 tracks may be received for the first object by the first sensor but the first image may be limited to an image based upon ten track reports. Thus, generating the first image may comprise generating the first image based upon the last ten tracks received for the first object. In particular, an object such as a tank may not move, may move slowly, or may move within the range of the first sensor. The first sensor may provide tracks for the tank continuously so hundreds of tracks may be received for the tank over a period of time. However, the number of pixels available in a spatial light modulator of one or more joint transform optical correlators may limit the number of pixels. A balance may be determined between the image size for an individual object from one sensor and the number of images to display on a spatial light modulator at one time. In further embodiments, there may be other considerations for the optimum window size per track.

Generating a second image to describe the second object based upon data associated with the second track, in a manner substantially equivalent to said generating a first image, to generate a second pattern similar to the first pattern when the first object is the second object 670 may generate the second image to generate the same image as the first image with the same track data or to generate the second image with a pattern similar to a pattern generated in the first image with the same data. Generating a second image 670 may comprise generating the second image based upon data from one sensor, wherein the first image is based upon data from a different sensor 675. Generating the second image based upon data from one sensor, wherein the first image is based upon data from a different sensor 675 may comprise generating images to compare track data from different sensors. In other embodiments, images may be generated to compare against images from the same sensor or sensor system to determine if echoes or duplicate tracks exist for the same object.

Generating a second image 670 may further comprise determining an overlap between a first sensor associated with the first track and a second sensor associated with the second track; and generating the second image with the second track based upon the overlap 680. Determining an overlap 680 may select images or tracks of images to generate based upon an overlap or a possibility of overlap between two sensors. For instance, sensor A may be at a fixed location outside the range of sensor B, which may also be at a fixed location. As a result, determining an overlap between a first sensor associated with the first track and a second sensor associated with the second track; and generating the second image with the second track based upon the overlap 680 may determine that no overlap exists between sensor A and sensor B so an image based upon tracks of sensor B may not be generated to compare with an image based upon the tracks of sensor A and vice versa. However, when a possibility is determined that the range of sensor C may overlap the range of sensor A, an image based upon the tracks of sensor C may be generated to compare with the image based upon tracks of sensor A and vice versa.

Still further embodiments may comprise combining the first image and the second image to generate a combined image 690. These embodiments may format a single image from two or more images to compare a reference image(s) against one or more other images simultaneously or substantially simultaneously. The combined image may comprise a reference image on one side and a comparison image to compare against the reference image on another side of the image, such as the combined image depicted in FIG. 4. The combined image may be generated to transmit to a joint transform optical correlator. Some embodiments may couple with systems to increase the input bandwidth to an optical or statistical correlator to allow more images to be compared by the optical or statistical correlator at one time. One such system, incorporated herein by the following reference, is described in a co-pending patent application entitled "Image Compression To Enhance Optical Correlation", Ser. No. 10/093,437, filed on the same day, and assigned to Anzus, Inc.

Figure 7:
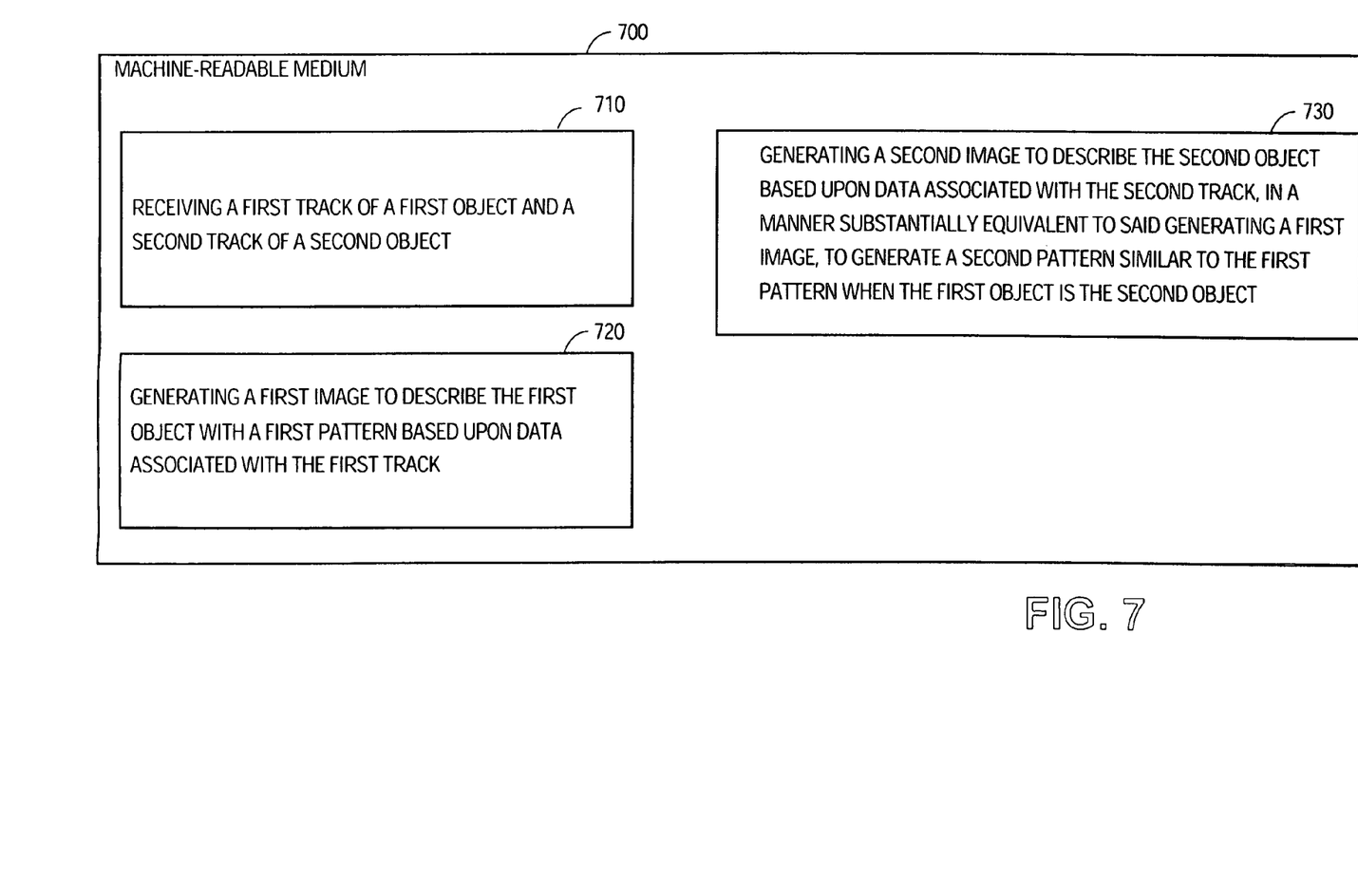
FIG. 7 depicts an embodiment of a machine-readable medium comprising instructions to format tracks from sensors to enhance correlation.

Referring now to FIG. 7, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention may comprise more than one machine-readable medium depending on the design of the machine.

In particular, FIG. 7 shows an embodiment of a machine-readable medium 700 comprising instructions, which when executed by a machine, cause the machine to perform operations, comprising receiving a first track of a first object and a second track of a second object 710; generating a first image to describe the first object with a first pattern based upon data associated with the first track 720; and generating a second image to describe the second object based upon data associated with the second track, in a manner substantially equivalent to said generating a first image, to generate a second pattern similar to the first pattern when the first object is the second object 730. Instructions for receiving a first track of a first object and a second track of a second object 710 may comprise instructions to receive data in the form of tracks and to forward that data, a subset of that data, or a set of data based upon that track data to an image generator.

Instructions for generating a first image to describe the first object with a first pattern based upon data associated with the first track 720 may comprise instructions for generating an image based upon track data from a set of tracks for a first object. In many embodiments, the image may comprise a color or feature to describe a quantity such as a distance or a coordinate and to distinguish that quantity from another quantity within a selected range of quantities such that the image or a pattern within the image may be distinguish that image from another image based upon data collected for a different object. For instance, instructions may comprise drawing a first line to describe an x-coordinate, a second line to describe a y-coordinate, a third line to describe a speed, and a fourth line to describe a direction, wherein the length of the lines are proportional or substantially proportional to the data indicated by a track. The different length lines may generate a first image with a unique or substantially unique pattern with respect to another image based upon data for a different object.

Instructions for generating a second image to describe the second object based upon data associated with the second track, in a manner substantially equivalent to said generating a first image, to generate a second pattern similar to the first pattern when the first object is the second object 730 may comprise instructions to generate the second image based upon the same rule(s) such as color scale(s), image format(s), image size(s), and/or origin(s). The rules may comprise instructions for selecting an origin of the image; the data of the tracks to generate the second image; the color scale to generate colors for pixels of the second image; the size, shape, and/or organization of the data on the image; and/or the size and shape of the image.

What is claimed is:

1. A method, comprising:
    receiving a first track of a first object and a second track of a second object;
    generating a first image to describe the first object with a first pattern based upon data associated with the first track; and
    generating a second image to describe the second object based upon data associated with the second track, in a manner substantially equivalent to said generating a first image, to generate a second pattern similar to the first pattern when the first object is the second object.

2. The method of claim 1, further comprising combining the first image and the second image to generate a combined image.

3. The method of claim 1, further comprising receiving a cost to associate tracks from more than one sensor with the first object.

4. The method of claim 1, further comprising receiving a coordinate transformation to transform the data associated with the first track.

5. The method of claim 1, wherein said receiving a first track comprises converting track data to Cartesian coordinates.

6. The method of claim 1, wherein said generating a first image comprises determining a color scale.

7. The method of claim 1, wherein said generating a first image comprises generating the first image based upon a position indicated by the first track.

8. The method of claim 7, wherein generating the first image based upon a position comprises generating at least one color for the position based upon a color scale.

9. The method of claim 7, wherein generating at least one color for the position based upon a color scale comprises associating an x-coordinate, y-coordinate, and z-coordinate of the position with the at least one color.

10. The method of claim 1, wherein generating a first image comprises generating at least one color based upon a speed and direction of the first object.

11. The method of claim 10, wherein generating at least one color based upon a speed and direction comprises associating an x-component, y-component, and z-component of the speed and direction with the at least one color.

12. The method of claim 1, wherein said generating a first image comprises generating the first image based upon positions indicated by more than one track of the first object.

13. The method of claim 1, wherein said generating a second image comprises generating the second image based upon data from one sensor, wherein the first image is based upon data from a different sensor.

14. The method of claim 1, wherein said generating a second image comprises:
    determining an overlap between a first sensor associated with the first track and a second sensor associated with the second track; and
    generating the second image with the second track based upon the overlap.

15. An apparatus, comprising:
    a track input to receive a first track to describe a first object and a second track to describe a second object;
    an image generator coupled with said track input to generate a first image to describe the first object with a first pattern based upon data associated with the first track and to generate a second image to describe the second object based upon data associated with the second track, in a manner substantially equivalent to generation of the first image, to generate a second pattern similar to the first pattern when the first object is the second object; and
    an image output coupled with said image generator to output the first image and the second image for comparison.

16. The apparatus of claim 15, further comprising a track buffer coupled with said image generator to store the first track and the second track.

17. The apparatus of claim 16, further comprising buffer logic coupled with said track input to remove contents of the track buffer.

18. The apparatus of claim 16, wherein the track buffer comprises memory to store track history.

19. The apparatus of claim 17, wherein the track buffer comprises memory to store a cost.

20. The apparatus of claim 15, further comprising an image buffer coupled with said image generator to store the first image.

21. The apparatus of claim 15, wherein said track input comprises a coordinate converter to convert coordinates of the first track.

22. The apparatus of claim 15, wherein said image generator comprises a color scale determiner coupled with said image generator to determine a color scale based upon a range of positions associated with the first image.

23. The apparatus of claim 15, wherein said image generator comprises a color scale determiner coupled with said image generator to determine a color scale based upon a range of velocities associated with the first image.

24. The apparatus of claim 15, wherein said image output comprises a combined image generator.

25. A system, comprising:
a track input to receive a first track to describe a first object and a second track to describe a second object;
a comparator to determine a coordinate transformation for a first sensor based upon an output of a gridlocking system;
an association system coupled with said comparator to associate the first track with the first sensor and to adjust data associated with the first sensor in accordance with the coordinate transformation;
an image generator coupled with said track input to generate a first image to describe the first object with a first pattern based upon data associated with the first object from the first sensor and to generate a second image to describe the second object based upon data associated with the second object from the second sensor, in a manner substantially equivalent to generation of the first image, to generate a second pattern similar to the first pattern when the first object is the second object; and
an image output coupled with said image generator to output the first image and the second image for comparison.

26. The system of claim 25, wherein said association system comprises an association process to associate the first track with the second track, wherein the first object is determined to be the second object to a degree of probability.

27. The system of claim 25, wherein said association system comprises a cost buffer to store a cost to associate the first track with the second track.

28. The system of claim 25, wherein said image generator comprises an image selector to select the first image and the second image to output for comparison.

29. A machine-readable medium containing instructions, which when executed by a machine, cause said machine to perform operations, comprising:
receiving a first track of a first object and a second track of a second object;
generating a first image to describe the first object with a first pattern based upon data associated with the first track; and
generating a second image to describe the second object based upon data associated with the second track, in a manner substantially equivalent to said generating a first image, to generate a second pattern similar to the first pattern when the first object is the second object.

30. The machine-readable medium of claim 29, wherein said generating a first image comprises generating the first image based upon a position indicated by the first track.

31. The machine-readable medium of claim 29, wherein said generating a second image comprises:
determining an overlap between a first sensor associated with the first track and a second sensor associated with the second track; and
generating the second image with the second track based upon the overlap.

* * * * *